United States Patent
Sekiguchi

(10) Patent No.: US 8,302,636 B2
(45) Date of Patent: Nov. 6, 2012

(54) TIRE SEALANT LIQUID CONTAINER

(75) Inventor: Takumi Sekiguchi, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 414 days.

(21) Appl. No.: 12/535,427

(22) Filed: Aug. 4, 2009

(65) Prior Publication Data

US 2010/0071822 A1 Mar. 25, 2010

(30) Foreign Application Priority Data

Sep. 22, 2008 (JP) ................. 2008-242910

(51) Int. Cl.
*B65B 31/00* (2006.01)

(52) U.S. Cl. ................ 141/38; 141/5; 141/100

(58) Field of Classification Search ............... 141/5, 38, 141/67, 100; 152/415
See application file for complete search history.

(56) References Cited

U.S. PATENT DOCUMENTS

| | | | |
|---|---|---|---|
| 5,908,145 A | 6/1999 | Jaksa | |
| 6,019,145 A * | 2/2000 | Savidge | 141/38 |
| 6,345,650 B1 * | 2/2002 | Paasch et al. | 141/5 |
| 6,766,834 B1 * | 7/2004 | Eckhardt | 141/38 |
| 6,889,723 B2 * | 5/2005 | Gerresheim et al. | 141/38 |
| 6,964,284 B2 * | 11/2005 | Eckhardt | 141/38 |
| 7,178,564 B2 * | 2/2007 | Kojima et al. | 141/38 |
| 7,389,800 B2 | 6/2008 | Hickman et al. | |
| 7,789,110 B2 * | 9/2010 | Marini | 141/38 |
| 7,798,183 B2 * | 9/2010 | Cegelski et al. | 141/38 |
| 7,854,242 B2 * | 12/2010 | Stehle | 141/38 |
| 8,016,002 B2 * | 9/2011 | Yoshida et al. | 141/38 |
| 2010/0071801 A1 | 3/2010 | Sekiguchi | |

FOREIGN PATENT DOCUMENTS

| | | |
|---|---|---|
| JP | A 9-118779 | 5/1997 |
| JP | A 2000-108215 | 4/2000 |
| JP | A 2008-23909 | 2/2008 |

* cited by examiner

*Primary Examiner* — Timothy L Maust
(74) *Attorney, Agent, or Firm* — Greer, Burns & Crain, Ltd.

(57) ABSTRACT

Provided is a tire sealant liquid container that accommodates a tire sealant liquid, and that includes on the lower side: an air supply hose guiding therein a compressed air outputted by a compressor; and a tire sealant liquid injection hose guiding the tire sealant liquid into a tire. Part of the outer surface of a container body is provided with a holder so that the air supply hose can be arranged to partially pass above a liquid level (7a) of the tire sealant liquid.

4 Claims, 4 Drawing Sheets

TIRE SEALANT LIQUID CONTAINER

BACKGROUND OF THE INVENTION

1. Field of the Invention

The present invention relates to a tire sealant liquid container, and more specifically to a tire sealant liquid container having a simple structure and preventing a tire sealant liquid from flowing back toward a compressor.

2. Description of the Related Art

Recently, what is called a puncture repair kit has been widely used. When a pneumatic tire (hereinafter, simply referred to as "tire") is punctured, the puncture repair kit is used to inject a tire sealant liquid into the punctured tire so that the tire sealant liquid can flow in a hole caused by the puncture. Then, with the puncture repair kit, the inner pressure of the punctured tire is increased up to a predetermined regulation value. Use of such a puncture repair kit eliminates the need of loading a vehicle with a spare tire, and thus has an advantage in resource saving and vehicle weight reduction as well as an advantage of allowing a space provided for loading a spare tire to be effectively used for another purpose.

FIG. 6 shows a usage state of a conventional tire sealant liquid container. The tire sealant liquid container 1 includes a container body 2 accommodating a tire sealant liquid 7 therein. The container body 2 is provided with an air inlet 3 and a tire sealant liquid outlet 4 on the lower side. An air supply hose 5 and a tire sealant liquid injection hose 6 are connected to the air inlet 3 and the tire sealant liquid outlet 4, respectively. Compressed air outputted by a compressor C passes through the air supply hose 5, and then enters the container body 2 through the air inlet 3. As a result, the compressed air pushes out the tire sealant liquid 7 accommodated in the container body 2 through the tire sealant liquid outlet 4. Then, the tire sealant liquid 7 passes through the tire sealant liquid injection hose 6, and is then introduced in a tire T.

However, a puncture repair kit to be used as above has a risk of allowing a tire sealant liquid to flow back through an air supply hose upon shutdown of a compressor. This might further lead to a problem that, after flowing back, the tire sealant liquid enters the compressor, which causes breakdown of the compressor to disable the operation thereof.

To solve this problem, Japanese patent application Kokai publication No. 2008-23909 discloses a sealing pump-up device having a housing in which a compressed air supply channel and a gas/liquid supply pipe line are connected to a sealant container. In this proposal, each of the compressed air supply channel and the gas/liquid supply pipe line winds its way in the housing so as to partially come above the liquid level of a sealant in the sealant container.

Such a structure in which pipe lines wind their way in a housing can prevent flowing back or leakage of a sealant. However, the structure requires the housing to accommodate the pipe lines, and thus increases the size of the whole device. Accordingly, an increased space is needed in a vehicle in order to accommodate the device having the structure. Thus, the structure has a problem of being incapable of fully giving a vehicle a benefit due to the elimination of a spare tire, such as vehicle weight reduction or effective use of space.

SUMMARY OF THE INVENTION

The present invention has been made to address the above problems, and an object thereof is to provide a tire sealant liquid container having a simple structure and preventing a tire sealant liquid from flowing back toward a compressor while remaining compact to store.

To achieve the above object, a tire sealant liquid container according to the present invention includes: an air inlet to which an air supply hose for guiding a compressed air outputted by a compressor is connected; and a tire sealant liquid outlet to which a tire sealant liquid injection hose for guiding the tire sealant liquid into a tire is connected. Here, the air inlet and the tire sealant liquid outlet are provided to the opening. The tire sealant liquid container is designed to stand with the opening of the container body down for puncture repair. In the tire sealant liquid container, an outer surface of the container body is provided with holding means for holding the air supply hose so as to allow part of the air supply hose to pass above a liquid level of the tire sealant liquid in the container body.

In addition, the tire sealant liquid container having the above structure should preferably be constructed as described as the following (1) to (3).

(1) The holding means is formed as any one of a protrusion and a recess that is formed on any one of side and top surfaces of the container body.

(2) The air inlet is formed into an L-shape consisting of two straight pipe lines communicating with each other: one is connected to the container body; the other is connected to the air supply hose and extending along the side surface of the container body.

(3) The opening is provided with a sealing film, and a cap to be detachably fitted on the opening, and a protrusion to pierce the sealing film is provided on an inner surface of the cap at an eccentric position.

According to the present invention, a tire sealant liquid container includes: an air inlet to which an air supply hose for guiding a compressed air outputted by a compressor is connected; and a tire sealant liquid outlet to which a tire sealant liquid injection hose for guiding the tire sealant liquid into a tire is connected. Here, the air inlet and the tire sealant liquid outlet are provided to the opening. The tire sealant liquid container is designed to stand with the opening of the container body down for puncture repair. In the tire sealant liquid container, an outer surface of the container body is provided with holding means for holding the air supply hose so as to allow part of the air supply hose to pass above a liquid level of the tire sealant liquid in the container body. Though simple in structure as described above, the tire sealant liquid container according to the present invention can prevent the tire sealant liquid from flowing back toward a compressor while remaining compact to store.

DETAILED DESCRIPTION OF THE PREFERRED EMBODIMENTS

Figure 1:
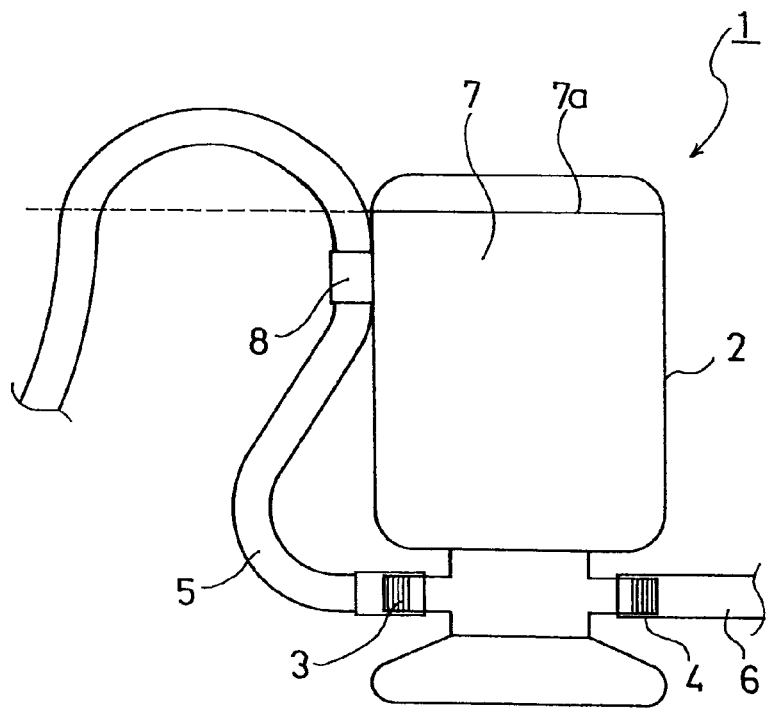
FIG. 1 is a cross-sectional view of a tire sealant liquid container according to an embodiment of the present invention.

FIG. 1 is a cross-sectional view of a tire sealant liquid container 1 according to an embodiment of the present invention. In FIG. 1, a container body 2 accommodates a tire sealant liquid 7 therein. The container body 2 is provided with an air inlet 3 and a tire sealant liquid outlet 4 on the lower side. An air supply hose 5 and a tire sealant liquid injection hose 6 are connected to the air inlet 3 and the tire sealant liquid outlet 4, respectively. The air supply hose 5 is held by a holder 8 provided on the outer surface of the container body 2 so that part of the air supply hose 5 can pass above a liquid level 7a of the tire sealant liquid 7. Accordingly, though not complicated but simple in structure, the tire sealant liquid container 1 can prevent the tire sealant liquid 7 from being forced to flow back by its own weight.

The shape of the holder 8 is not particularly limited. However, using a member such as hook and loop fasteners as the holder 8 might lead to increase in the number of components or to an accident in which the air supply hose 5 is forced to come off the holder 8 by its own weight. As the holder 8, one or more protrusions 8a or a recess 8b should preferably be provided as shown in FIGS. 2a to 2d. In addition, a portion, in contact with the air supply hose 5, of the holder 8 may be provided with a claw or a roughened surface for preventing the air supply hose 5 from coming off or slipping in the holder 8.

Figure 2A:
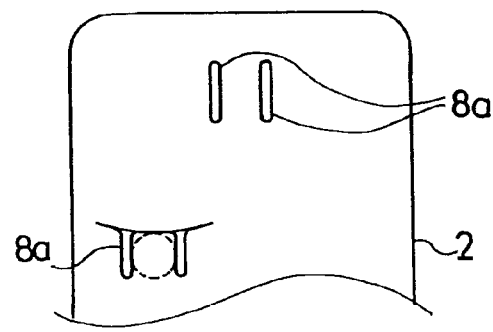
FIGS. 2a to 2d each show a side view of a container body provided with a holder according to an embodiment of the present invention as well as an overhead view of the holder.
Figure 2B:
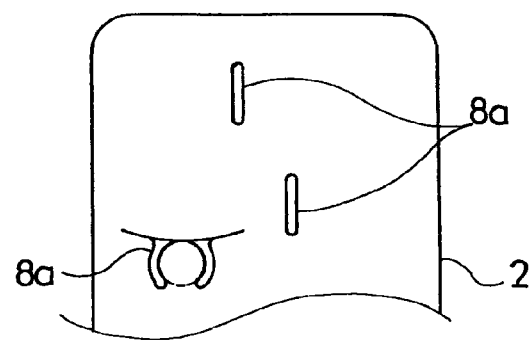
Figure 2C:
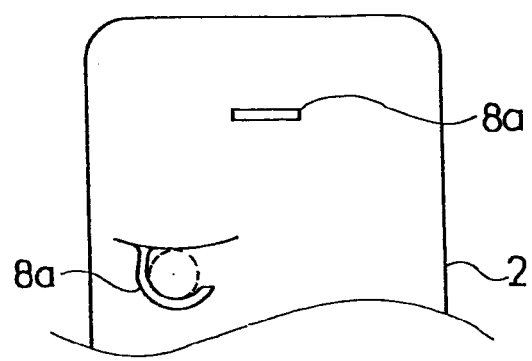
Figure 2D:
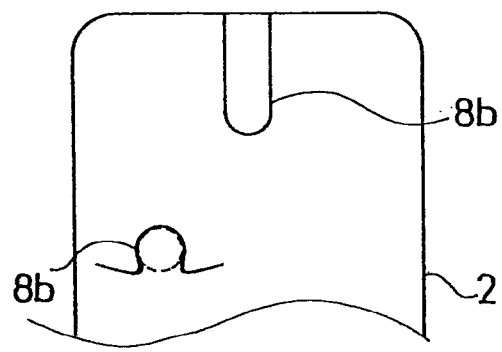

FIGS. 2a to 2d show several examples of the holder 8 of the tire sealant liquid container 1 according to the embodiment of the present invention. FIG. 2a shows an example in which two plate-like protrusions 8a are provided on the outer surface of the container body 2 on the same level and at an interval equivalent to the diameter of the air supply hose 5. In this case, the air supply hose 5 is held between the two protrusions 8a. FIG. 2b shows an example in which the outer surface of the container body 2 is provided with two plate-like protrusions 8a each curved so as to conform to the shape of the air supply hose 5. In this case, the shapes of the protrusions 8a curved to conform to the shape of the air supply hose 5 eliminate the need to provide the two protrusions 8a in parallel on the same level as shown in FIG. 2a, and thus allows the two protrusions 8a to be alternately provided on different levels as shown in FIG. 2b. FIG. 2c shows an example in which the outer surface of the container body 2 is provided with a bar-like protrusion 8a curved like a claw so as to conform to the shape of the air supply hose 5. In this case, the protrusion 8a grabs the air supply hose 5. FIG. 2d shows an example in which the outer surface of the container body 2 is provided with a recess 8b having a diameter equivalent to that of the air supply hose 5. In this case, the air supply hose 5 is fitted in the recess 8b.

Figure 3A:
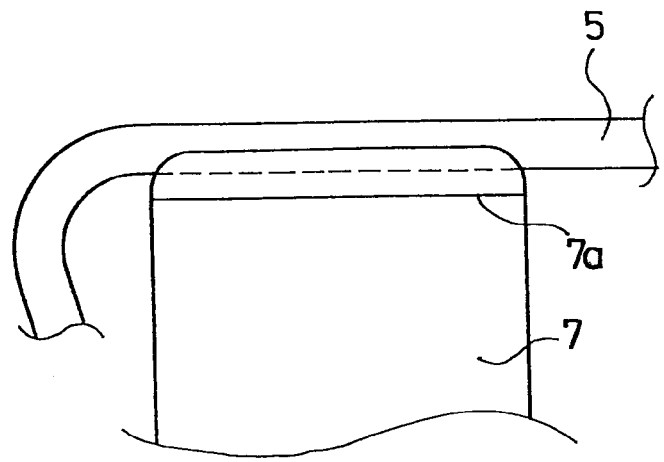
FIGS. 3a and 3b each show a side view of a container body provided with a holder according to another embodiment of the present invention.
Figure 3B:
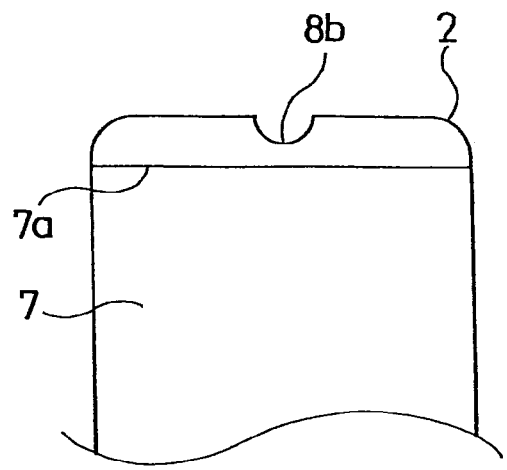

Alternatively, as shown in FIGS. 3a and 3b, the top surface of the container body 2 is provided with a recess 8b, and the air supply hose 5 is fitted in the recess 8b to be fixed to the container body 2. The position of the compressor C during use is not particularly specified. Accordingly, the air supply hose 5 may pass through the recess 8b provided on the top surface of the container body 2 so that the end of the air supply hose 5 connected to the compressor C may come to the side to which the tire sealant liquid injection hose 6 is connected.

Note that the shape of the holder 8 is not limited to the examples shown in FIGS. 2a to 2b, 3a and 3b, but may be any shape as long as it enables the holder 8 to hold the air supply hose 5. The holder 8 may be provided in any form and at any position as long as the position is on the outer surface of the container body 2. However, since the air supply hose 5 has adequate rigidity, the air supply hose 5 should preferably be held above the middle of the container body 2.

Figure 4:
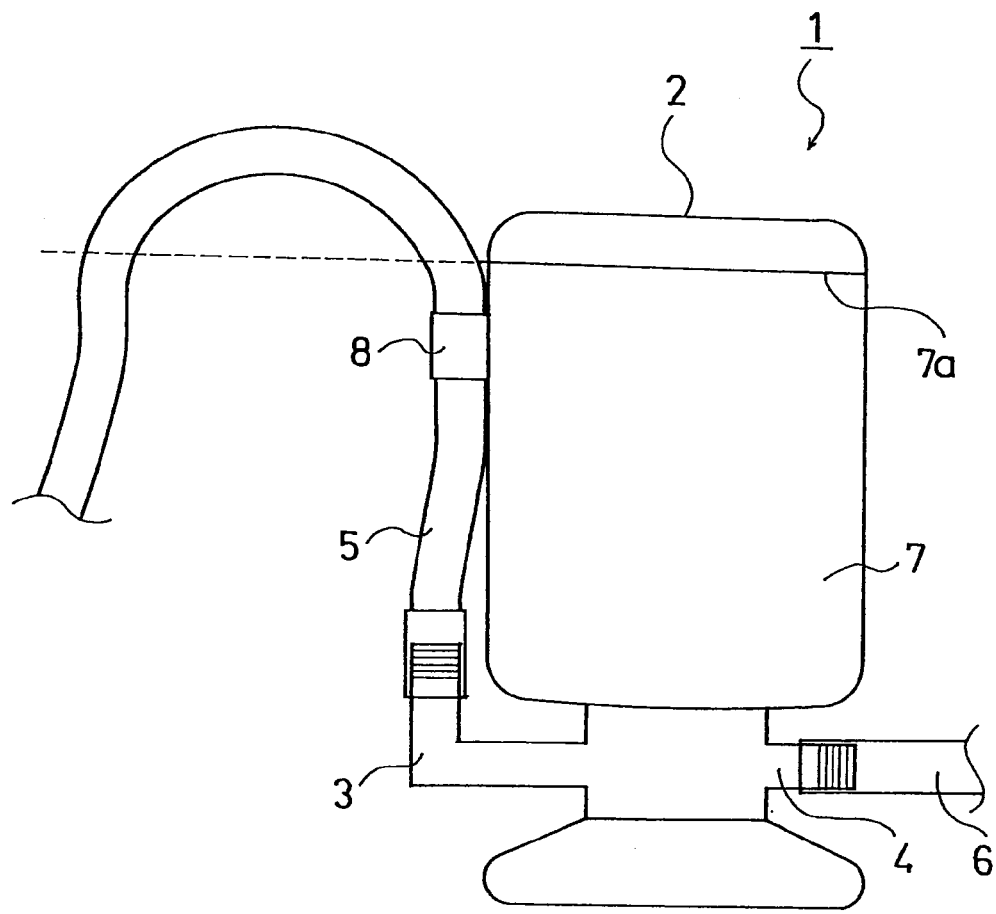
FIG. 4 is a cross-sectional view of a tire sealant liquid container according to another embodiment of the present invention.

As shown in FIG. 4, in order to help the air supply hose 5 pass along the outer surface of the container body 2, the air inlet 3 may be formed into an L-shape consisting of two straight pipe lines communicating with each other: one is connected to the container body 2; the other is connected to the air supply hose 5 and extends along the side surface of the container body 2. Here, attaching the air supply hose 5 to the holder 8 might cause the air supply hose 5 to kink to block air supply. However, forming the air inlet 3 in an L-shape as described above eliminates such a risk. In addition, this also prevents the slack of the air supply hose 5, and thus is more effective in space saving and makes the tire sealant liquid container more compact to store. The pipe line connected to the air supply hose 5 may extend so that its leading end can reach the upper side of the container body 2.

In the present invention, the tire sealant liquid container 1 need not necessarily be integrally formed. In other words, the container body 2 and a cap 9 to be detachably fitted to the opening 2a of the container body 2 may be formed separately. In this case, the container body 2 and the cap 9 are combined for use. The cap 9 is combined with the container body 2 by any method such as screwing thereon or fitting thereon. However, the screwing is more preferable to reliably seal up the opening 2a. Forming the container body 2 and the cap 9 as separate members in this way so as to be combined for use is more effective in space saving since this structure allows the container body 2 and the cap 9 to be separately loaded in a vehicle. In addition, this structure is also effective in resource saving since, after use, just the container body 2 needs to be exchanged but the cap 9 can be reused.

Figure 5A:
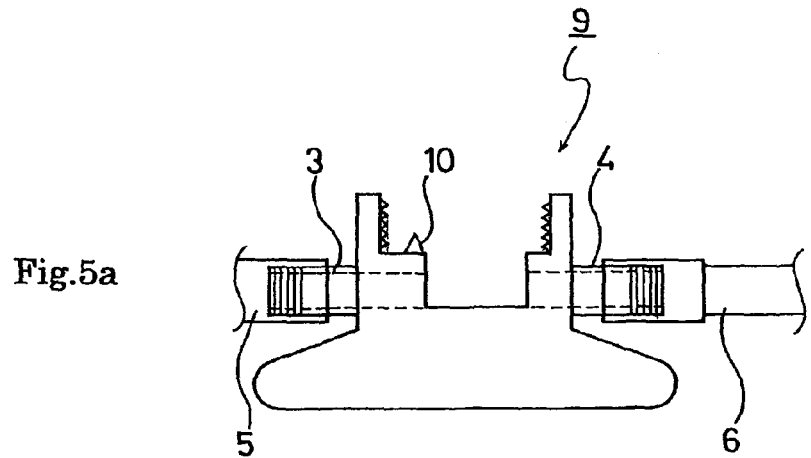
FIGS. 5a and 5b are each a cross-sectional view of a cap according to another embodiment of the present invention.
Figure 5B:
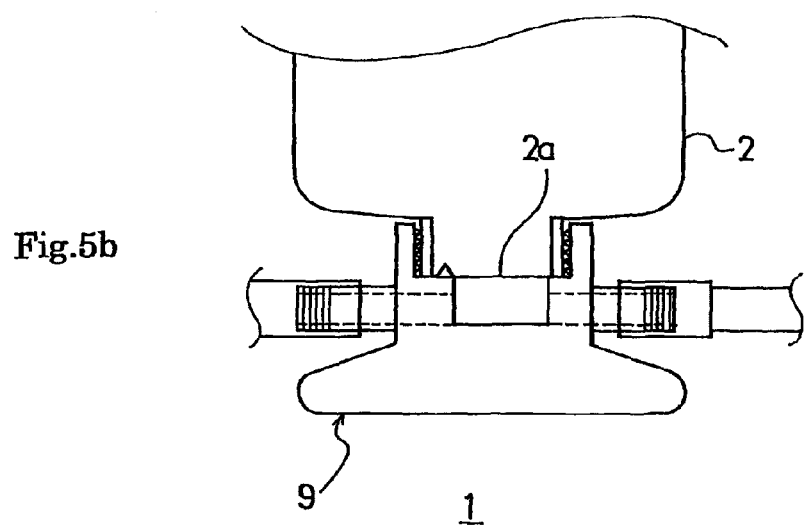
Figure 6:
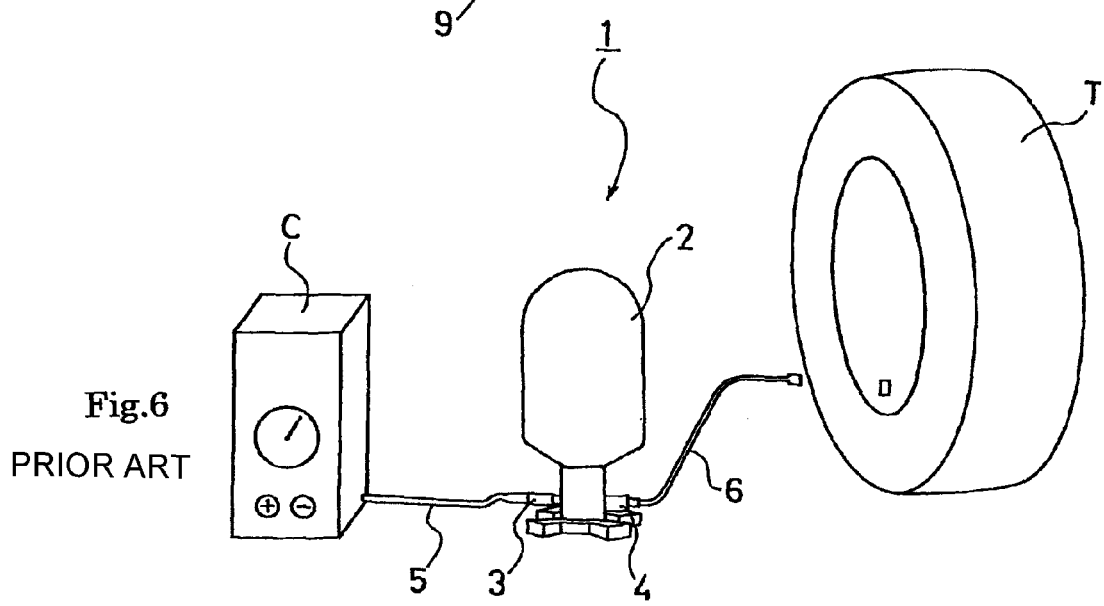
FIG. 6 is a perspective view showing a usage state of a conventional tire sealant liquid container.

When the container body 2 and the cap 9 are formed as separate members as described above, the opening 2a of the container body 2 should preferably be stopped up with a sealing film made of aluminum or a resin in order to prevent degradation or leakage of the tire sealant liquid 7. In this case, a protrusion 10 to pierce the sealing film should preferably be provided on the cap 9, as shown in FIGS. 5a and 5b. The protrusion 10 may be provided at any point as long as the point is within a region to face the opening 2a.

When the cap 9 is combined with the container body 2 by screwing thereon, the protrusion 10 to pierce the sealing film should preferably be provided on the inner surface of the cap 9 at an eccentric position. Providing the protrusion 10 at an eccentric position of the inner surface of the cap 9 increases the length of the break of the sealing film caused by the protrusion 10, and thus reliably enables the tire sealant liquid 7 to flow out. By contrast, when the protrusion 10 is provided at the center of the cap 9, the protrusion 10 can pierce the sealing film, but cannot make a major break in the sealing film even after the screwing rotation of the cap 9. The protrusion 10 should preferably have such a length as to break the sealing film by a quarter of the circumference of the opening 2a. Making too major break in the sealing film might cause a fragment of the broken sealing film to jam in the hose.

What is claimed is:
1. A tire sealant liquid container comprising:
a container body having an end provided with an opening for filling a tire sealant liquid;
an air inlet to which an air supply hose for guiding a compressed air outputted by a compressor is connected, the air inlet being provided to the opening; and a tire sealant liquid outlet to which a tire sealant liquid injection hose for guiding the tire sealant liquid into a tire is connected, the tire sealant liquid outlet being provided to the opening, wherein the tire sealant liquid container is designed to stand with the opening of the container body below the container body for puncture repair, and an outer surface of the container body is provided with holding means for holding the air supply hose so as to allow part of the air supply hose to pass above a liquid level of the tire sealant liquid in the container body, wherein further the opening is provided with a sealing film, and a cap to be detachably fitted on the opening, and a protrusion to pierce the sealing film is provided on an inner surface of the cap at an eccentric position.

2. The tire sealant liquid container according to claim 1, wherein the holding means is formed as any one of a protrusion and a recess that is formed on any one of side and top surfaces of the container body.

3. The tire sealant liquid container according to claim 1, wherein the air inlet is formed into an L-shape consisting of two straight pipe lines communicating with each other, one of the pipe lines being connected to the container body, the other pipe line being connected to the air supply hose and extending along the side surface of the container body.

4. The tire sealant liquid container according to claim 2, wherein the air inlet is formed into an L-shape consisting of two straight pipe lines communicating with each other, one of the pipe lines being connected to the container body, the other pipe line being connected to the air supply hose and extending along the side surface of the container body.

* * * * *